(12) United States Patent
Akiki et al.

(10) Patent No.: US 8,751,216 B2
(45) Date of Patent: Jun. 10, 2014

(54) TABLE MERGING WITH ROW DATA REDUCTION

(75) Inventors: Rouba Akiki, Dublin (IE); Thomas J. Dinger, Sunnyvale, CA (US); John McEvoy, Trim (IE); Kathleen Murray, Bridgend (IE)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/982,605

(22) Filed: Dec. 30, 2010

(65) Prior Publication Data

US 2012/0173226 A1    Jul. 5, 2012

(51) Int. Cl.
*G06F 17/28* (2006.01)

(52) U.S. Cl.
USPC ........................................ 704/3; 704/2; 704/7

(58) Field of Classification Search
USPC .......................................................... 704/2–8
See application file for complete search history.

(56) References Cited

U.S. PATENT DOCUMENTS

| 5,787,410 | A | * | 7/1998 | McMahon | 707/760 |
|---|---|---|---|---|---|
| 5,913,209 | A | * | 6/1999 | Millett | 1/1 |
| 7,668,860 | B2 | * | 2/2010 | Naibo et al. | 707/794 |
| 7,725,498 | B2 | | 5/2010 | Barsness et al. | |
| 2006/0173884 | A1 | * | 8/2006 | Lin et al. | 707/101 |
| 2007/0005635 | A1 | * | 1/2007 | Martinez et al. | 707/102 |
| 2012/0005153 | A1 | * | 1/2012 | Ledwich et al. | 707/602 |

* cited by examiner

*Primary Examiner* — Jesse Pullias
(74) *Attorney, Agent, or Firm* — Steven M. Greenberg, Esq.; CRGO Law

(57) ABSTRACT

Embodiments of the present invention provide a method, system and computer program product for the table merging of correlated columns with row data reduction. In an embodiment of the invention, a method for table merging with row data reduction for merged columns can include selecting a first table of columns and a second table of columns for merger in a computer data processing system. A column of rows in the first table can be matched with a column of rows in the second table. Subsequently, it can be determined that the rows of the first table are the same in number as the rows of the second table and that the matched columns include identical data in the respective ones of the rows. Consequently, a merged table of an aggregation of the columns of the first table and the second table can be generated to exclude from the aggregation one of the matched columns that includes identical data in the respective ones of the rows as the other of the matched columns.

17 Claims, 1 Drawing Sheet

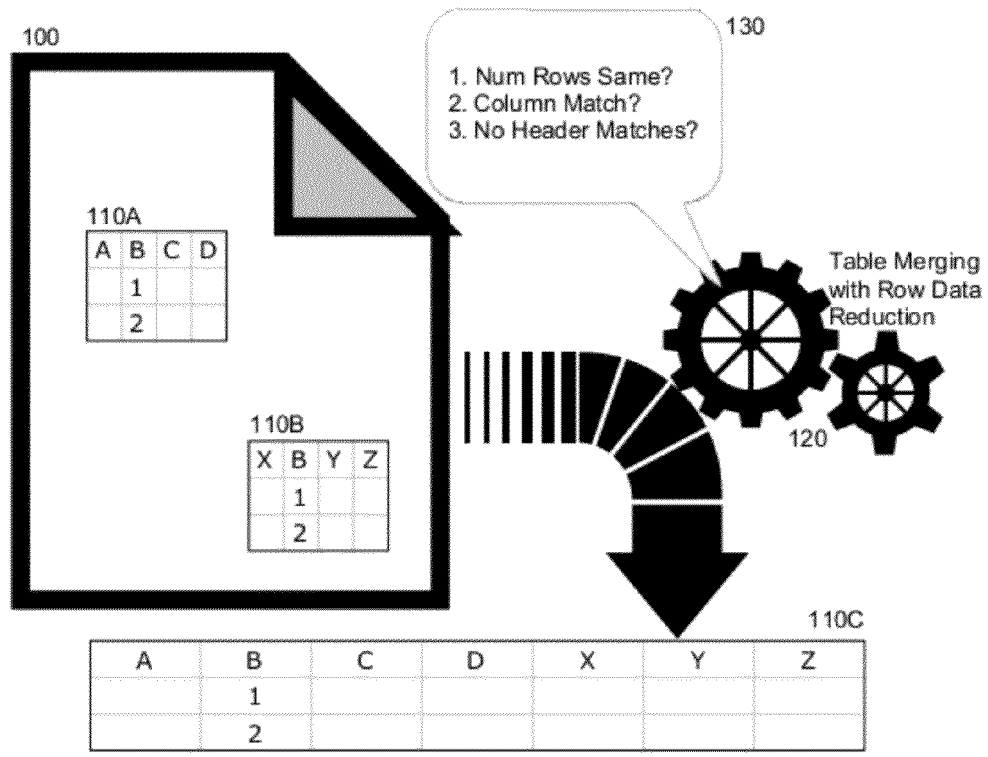
FIG. 1
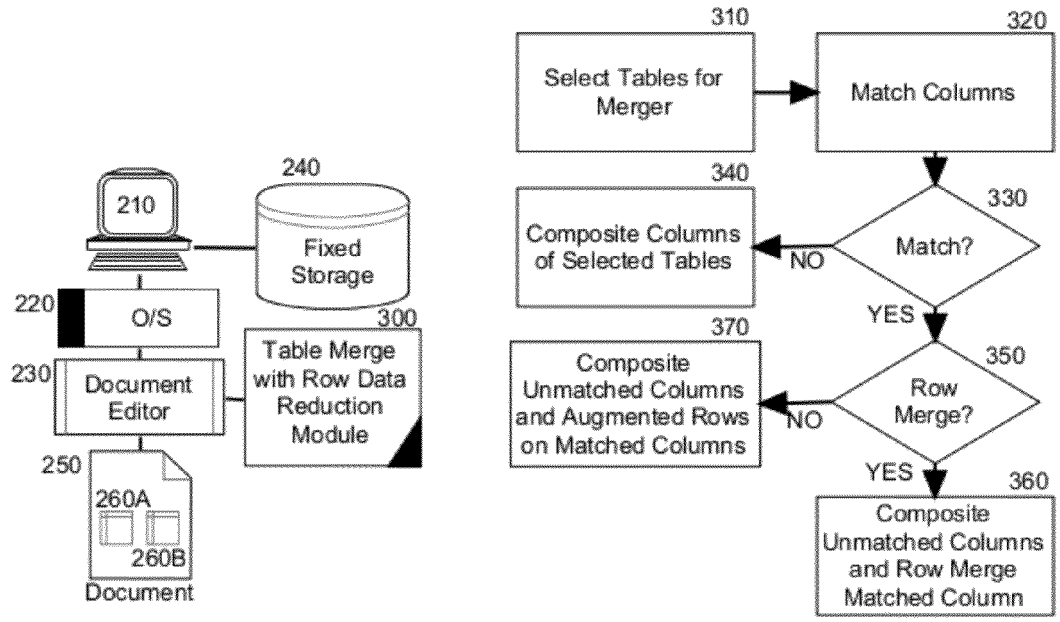
FIG. 2      FIG. 3

TABLE MERGING WITH ROW DATA REDUCTION

BACKGROUND OF THE INVENTION

1. Field of the Invention

The present invention relates to database table management and more particularly to merging different database tables.

2. Description of the Related Art

A database consists of an organized collection of data for one or more uses, typically in digital form. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. A flat file database describes any of various means to encode a database model (most commonly a table) as a single file. Finally, a simple table can be included as part of a simple document such as a word processing document or a spreadsheet.

The overall organization of a database is typically referred to as a schema for the database, such as a hierarchical or relational schema. A database schema is often compactly expressed using table names and names of columns in tables. Accordingly, a database may contain multiple tables, each containing different columns. The tables can be populated with data from different data sources. Oftentimes, to efficiently analyze data collected in different tables, it is desirable to merge the different tables into a single table. However, one difficulty when merging independently created database tables consists in identifying correlated columns in the database tables that are mergeable to create a meaningful merged result. To establish a proper correlation, though, one must know the exact meaning of each column in the different tables. For a simple table, manually identifying correlated columns in different tables is of no consequence. For larger tables of many columns, the task can be daunting.

U.S. Pat. No. 7,725,498 to Eric L. Barsness et al. for TECHNIQUES FOR IDENTIFYING MERGEABLE DATA (hereinafter, "Barsness") addresses the process of establishing a correlation between columns in two different tables selected for merger. In this regard, as described in the Abstract of Barsness, correlation attributes are determined for a first column and a second column from one or more database tables. The correlation attributes describe for each column either or both the column and the content of the column. The correlation attributes from the first and second column then are compared and similarities between the first and second column are identified on the basis of the comparison. Then, on the basis of the identified similarities, it is determined whether the first and second columns are correlated. Only if the columns are determined to be correlated, the first and second columns are merged.

The process of merging related columns however, involves simply aggregating the rows of each related column into a single column whose total rows are the sum of the rows of the related columns. Consequently, the general algorithm of merging columns fails to account for the reality that some rows in the merged column may contain duplicate data to the extent that the source rows in the correlated columns may contain the same data. Accordingly, the merged table with merged columns may contain undesired inaccuracies.

BRIEF SUMMARY OF THE INVENTION

Embodiments of the present invention address deficiencies of the art in respect to table merging and provide a novel and non-obvious method, system and computer program product for the table merging of correlated columns with row data reduction. In an embodiment of the invention, a method for table merging with row data reduction for merged columns can include selecting a first table of columns and a second table of columns for merger in a computer data processing system. A column of rows in the first table can be matched with a column of rows in the second table. Subsequently, it can be determined that the rows of the first table are the same in number as the rows of the second table and that the matched columns include identical data in the respective ones of the rows. Consequently, a merged table of an aggregation of the columns of the first table and the second table can be generated to exclude from the aggregation one of the matched columns that includes identical data in the respective ones of the rows as the other of the matched columns.

In another embodiment of the invention, a computer data processing system can be configured for table merging with row data reduction for merged columns. The system can include a computer with at least one processor and memory and first and second tables loaded into the memory of the computer. A table merge with row data reduction module can execute in the memory of the computer. The module can include program code enabled to select the first and second tables for merger, to match a column of a plurality of rows in the first table with a column of a plurality of rows in the second table, to determine that the rows of the first table are the same in number as the rows of the second table and that the matched columns include identical data in the respective ones of the rows, and to generate in a merged table an aggregation of the columns of the first table and the second table, but to exclude in the aggregation of the columns of the merged table one of the matched columns that includes identical data in the respective ones of the rows as the other of the matched columns. Of note, the first and second tables can be disposed in a database management system or in a document.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for table merging with row data reduction for merged columns;

FIG. 2 is a schematic illustration of a data processing system configured for table merging with row data reduction for merged columns; and, FIG. 3 is a flow chart illustrating a process for table merging with row data reduction for merged columns.

DETAILED DESCRIPTION OF THE INVENTION

Embodiments of the invention provide for table merging with row data reduction for merged columns. In accordance with an embodiment of the invention, two different tables can be selected for merger, each of the tables including at least one column and each column including at least one row of data. A column of a first one of the different tables can be correlated to a column of a second one of the different tables. The correlated columns can be merged together into a merged column by aggregating the data from the cells of each of the correlated columns, however, if the number of rows of the column of the first one of the different tables is equal to the number of rows of the column of the second one of the different tables, and if the data in the rows of the respective columns are identical, then only the rows from one of the correlated columns will be included in the merged column and the rows from the other of the correlated columns will be discarded.

In further illustration, FIG. 1 pictorially shows a process for table merging with row data reduction for merged columns. As shown in FIG. 1, a document 100 can include two different tables 110A, 110B. Each of the tables 110A, 110B can include multiple different columns and multiple different rows. In response to a directive to merge the tables 110A, 110B into a single merged table 110C in the document 100, table merging with row reduction logic 120 can process the tables 110A, 110B according to row reduction criteria 130. The row reduction criteria 130 includes a determination of whether or not the number of rows in the tables 110A, 110B is the same, whether or not one or more column headers in the tables 110A, 110B match, and of the columns with matching headers in the tables 110, 110B, whether or not the data in the rows of the columns with matching headers is the same for both tables 110A, 110B. If so, when producing the merged table 110A, 110B, the columns with matching headers and equivalent data can be merged into a single representative column in the merged table 110C, while the remaining columns can be appended to one another in the merged table 110C.

The process described in connection with FIG. 1 can be implemented in a computer data processing system such as a database management system or document editor supporting the inclusion and management of tables. In further illustration, FIG. 2 schematically shows a data processing system configured for table merging with row data reduction for merged columns. The system can include a host computer 210 with at least one processor and memory and coupled to fixed storage 240. An operating system 220 can execute in the memory of the host computer 210 and can host the operation of a document editor 230 in which a document 250 inclusive of two different tables 260A, 260B can be viewed and edited.

Of note, a table merge with row data reduction module 300 can be coupled to the document editor. The module 300 can include program code that when executed in the memory of the host computer 210 can respond to a directive to merge the tables 260A, 260B first by identifying columns in both tables 260A, 260B sharing a common title or column header. The identifying of columns in both tables 260A, 260B sharing a common title or column header can result from a simple textual matching of the header name of each of the columns of the tables 260A, 260B, a matching of a natural language translation of each of the headers of the columns of the tables 260A, 260B, or the matching of the output of text analytics applied to the column headers of the columns of the tables 260A, 260B and also the data in the rows of each of the columns of the tables 260A, 260B.

Of note, if at least a pair of columns in the tables 260A, 260B are found to match, it can be determined by the program code of the module 300 whether or not the tables 260A, 260B have the same number of rows. If so, it further can be determined whether or not the data in each of the matching columns in the tables 260A, 260B includes an identical set of data in the respective rows. If so, the matching columns of the tables 260A, 260B can be row data reduced by the program code of the module 300. More particularly, only a single representative one of the matching columns of the tables 260A, 260B will be included in a merged form of the tables 260A, 260B as follows:

| HEADER 1 | HEADER 2 |
|---|---|
| DATA 1 | DATA 2 |

Merged with

| HEADER 2 | HEADER 3 |
|---|---|
| DATA 2 | DATA 4 |

To Produce Merged Table

| HEADER 1 | HEADER 2 | HEADER 3 |
|---|---|---|
| DATA 1 | DATA 2 | DATA 4 |

For columns that do not match in the tables 260A, 260B, the unmatching columns simply can be appended by the program code of the module 300 in the merged form of the tables 260A, 260B as follows:

| HEADER 1 | HEADER 2 |
|---|---|
| DATA 1 | DATA 2 |

Merged with

| HEADER 3 | HEADER 4 |
|---|---|
| DATA 3 | DATA 4 |

To Produce Merged Table

| HEADER 1 | HEADER 2 | HEADER 3 | HEADER 4 |
|---|---|---|---|
| DATA 1 | DATA 2 | DATA 3 | DATA 4 |

Finally, for matching columns in the tables 260A, 260B that do not share a common set of data in the rows of the columns, a single column can be provided in the merged form of the tables 260A, 260B with data from both columns in the rows such that the single column in the merged form of the tables 260A, 260B includes as many rows as the sum of the rows of the matching columns in the tables 260A, 260B as follows:

| HEADER 1 | HEADER 2 |
|---|---|
| DATA 1 | DATA 2 |

Merged with

| HEADER 2 | HEADER 3 |
|---|---|
| DATA 3 | DATA 4 |

To Produce Merged Table

| HEADER 1 | HEADER 2 | HEADER 3 |
|---|---|---|
| DATA 1 | DATA 2 | |
| | DATA 3 | DATA 4 |

In yet further illustration of the operation of the module 300, FIG. 3 is a flow chart illustrating a process for table merging with row data reduction for merged columns. Beginning in block 310, different tables can be selected for merger. In block 320, columns from the tables can be matched to determine whether the columns pertain to the same subject matter. In this regard, a word-by-word comparison of the column headers can be performed and identical words can be presumed to indicate the same subject matter in the respective columns. Additionally, language translation can be performed on the terms of the column headers to equate linguistically disparate terms in the column headers meaning the same term (such as "Address" and "Addresse" or "Name" and "Nom"). As yet another alternative, textual analysis can be performed to equate textually disparate terms in the column headers to mean the same term (such as "Address" and "Home" or "Employee Number" and "Worker ID"). As even yet another alternative, the data of the rows of the columns can be analyzed to determine if the data is of the same type, such as an address or telephone number. If so, the columns can be considered the same.

In decision block 330, if the columns are not considered to have matched, in block 340 the columns can be composited to an aggregation of the columns in a merged form of the tables. Otherwise, in decision block 350, it can be determined whether or not a row data reduction operation can be performed. The row data reduction can be performed when the number of rows in the selected tables is the same, when the columns match and when the data of the rows of the matching columns are identical. If so, in block 360 the unmatched columns of the tables can be composited into an aggregation in a merged form of the tables, and the matching columns with disparate data can be composited into an aggregation in the merged form of the tables, while the matching columns meeting the row data reduction criteria can be represented by a single instance of the matching columns meeting the row data reduction criteria while the other matching columns meeting the row data reduction criteria can be excluded from the merged form of the tables. Otherwise, in block 370, the unmatched columns of the tables can be composited into an aggregation in a merged form of the tables, and the matching columns with disparate data can be composited into an aggregation in the merged form of the tables.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for table merging with row data reduction for merged columns, the method comprising:

selecting a first table of a plurality of columns and a second table of a plurality of columns for merger in a computer data processing system;

matching a column of a plurality of rows in the first table with a column of a plurality of rows in the second table;

determining whether the rows of the first table are the same in number as the rows of the second table and whether the matched columns include identical data in the respective ones of the rows;

if it is determined that the rows of the first table are the same in number as the rows of the second table and that the matched columns include identical data in the respective ones of the rows, generating in a merged table an aggregation of the columns of the first table and the second table, but excluding in the aggregation of the columns of the merged table one of the matched columns that includes identical data in the respective ones of the rows as the other of the matched columns; and if it is determined that the rows of the first table are not the same in number as the rows of the second table or that the matched columns do not include identical data in the respective ones of the rows, generating in a merged table an aggregation of the columns of the first table and the second table in which the matching columns with disparate data are merged into a column with an aggregation of the disparate data.

2. The method of claim 1, wherein matching a column of a plurality of rows in the first table with a column of a plurality of rows in the second table, comprises matching each word in a column header of a column of a plurality of rows in the first table with each word in a column header of a column of a plurality of rows in the second table.

3. The method of claim 1, wherein matching a column of a plurality of rows in the first table with a column of a plurality of rows in the second table, comprises:

determining that a term in a column header for the column in the first table is of a primary language, while a term in a column header for the column in the second table is of a different language;

performing language translation of the term in the column header for the column in the second table from the different language into the primary language; and, matching the term in the column header of the column in the first table in the primary language with the translated term in the column header of the column in the second table.

4. The method of claim 1, wherein matching a column of a plurality of rows in the first table with a column of a plurality of rows in the second table, comprises performing textual analysis of terms in a column header for the column in the first table to equate the terms to textually disparate terms in a column header for the column in the second table.

5. The method of claim 1 wherein matching a column of a plurality of rows in the first table with a column of a plurality of rows in the second table, comprises:

comparing data in the rows of the column in the first table with data in the rows of the of the column in the second table; and, determining that the column in the first table matches the column in the second table when the data in the rows of the column in the first table are of a same type as data in the rows of the column in the second table.

6. A computer data processing system configured for table merging with row data reduction for merged columns, the system comprising:

a computer with at least one processor and memory;

first and second tables loaded into the memory of the computer; and, a table merge with row data reduction module executing in the memory of the computer, the module comprising program code enabled to select the first and second tables for merger, match a column of a plurality of rows in the first table with a column of a plurality of rows in the second table, determine whether the rows of the first table are the same in number as the rows of the second table and whether the matched columns include identical data in the respective ones of the rows, if it is determined that the rows of the first table are the same in number as the rows of the second table and that the matched columns include identical data in the respective ones of the rows, generate in a merged table an aggregation of the columns of the first table and the second table, but to exclude in the aggregation of the columns of the merged table one of the matched columns that includes identical data in the respective ones of the rows as the other of the matched columns, and if it is determined that the rows of the first table are not the same in number as the rows of the second table or that the matched columns do not include identical data in the respective ones of the rows, generate in a merged table an aggregation of the columns of the first table and the second table in which the matching columns with disparate data are merged into a column with an aggregation of the disparate data.

7. The system of claim 6, wherein the first and second tables are disposed in a database management system.

8. The system of claim 6, wherein the first and second tables are disposed in a document.

9. The system of claim 6, wherein the program code of the module matches the columns by comparing terms of respective column headers of the columns.

10. The system of claim 6, wherein the program code of the module matches the columns by language translating a term of a column header of one of the columns into a language for a term of a column header for another of the columns and comparing the term of the one of the columns with the translated term of the another of the columns.

11. The system of claim 6, wherein the program code of the module matches the columns by performing textual analysis of respective column headers of the columns.

12. The system of claim 6, wherein the program code of the module matches the columns by comparing data types in the rows of the columns and concluding a match where the data types of the rows match.

13. A computer program product for table merging with row data reduction for merged columns, the computer program product comprising:

a computer readable storage medium having computer readable program code embodied therewith, the computer readable program code comprising:

computer readable program code for selecting a first table of a plurality of columns and a second table of a plurality of columns for merger in a computer data processing system;

computer readable program code for matching a column of a plurality of rows in the first table with a column of a plurality of rows in the second table;

computer readable program code for determining whether the rows of the first table are the same in number as the rows of the second table and whether the matched columns include identical data in the respective ones of the rows;

computer readable program code for, if it is determined that the rows of the first table are the same in number as the rows of the second table and that the matched columns include identical data in the respective ones of the rows, generating in a merged table an aggregation of the columns of the first table and the second table, but excluding in the aggregation of the columns of the merged table one of the matched columns that includes identical data in the respective ones of the rows as the other of the matched columns; and computer readable program code for, if it is determined that the rows of the first table are not the same in number as the rows of the second table or that the matched columns do not include identical data in the respective ones of the rows, generating in a merged table an aggregation of the columns of the first table and the second table in which the matching columns with disparate data are merged into a column with an aggregation of the disparate data.

14. The computer program product of claim 13, wherein the computer readable program code for matching a column of a plurality of rows in the first table with a column of a plurality of rows in the second table, comprises matching each word in a column header of a column of a plurality of rows in the first table with each word in a column header of a column of a plurality of rows in the second table.

15. The computer program product of claim 13, wherein the computer readable program code for matching a column of a plurality of rows in the first table with a column of a plurality of rows in the second table, comprises:

computer readable program code for determining that a term in a column header for the column in the first table is of a primary language, while a term in a column header for the column in the second table is of a different language;

computer readable program code for performing language translation of the term in the column header for the column in the second table from the different language into the primary language; and, computer readable program code for matching the term in the column header of the column in the first table in the primary language with the translated term in the column header of the column in the second table.

16. The computer program product of claim 13, wherein the computer readable program code for matching a column of a plurality of rows in the first table with a column of a plurality of rows in the second table, comprises computer readable program code for performing textual analysis of terms in a column header for the column in the first table to equate the terms to textually disparate terms in a column header for the column in the second table.

17. The computer program product of claim 13 wherein the computer readable program code for matching a column of a plurality of rows in the first table with a column of a plurality of rows in the second table, comprises:

computer readable program code for comparing data in the rows of the column in the first table with data in the rows of the of the column in the second table; and, computer readable program code for determining that the column in the first table matches the column in the second table when the data in the rows of the column in the first table are of a same type as data in the rows of the column in the second table.

* * * * *